US007836410B2

(12) United States Patent
Vignet

(10) Patent No.: US 7,836,410 B2
(45) Date of Patent: Nov. 16, 2010

(54) WINDOW POSITIONER/SIZER

(75) Inventor: Peter Vignet, San Francisco, CA (US)

(73) Assignee: SAP AG, Walldorf (DE)

( * ) Notice: Subject to any disclaimer, the term of this patent is extended or adjusted under 35 U.S.C. 154(b) by 435 days.

(21) Appl. No.: 11/326,840

(22) Filed: Jan. 6, 2006

(65) Prior Publication Data

US 2007/0162868 A1 Jul. 12, 2007

(51) Int. Cl.
*G06F 3/048* (2006.01)

(52) U.S. Cl. ........................................ 715/808

(58) Field of Classification Search ................ 715/788, 715/798, 781
See application file for complete search history.

(56) References Cited

U.S. PATENT DOCUMENTS 4,555,775 A * 11/1985 Pike .......................... 715/790
4,714,918 A * 12/1987 Barker et al. ................ 345/684
4,783,648 A * 11/1988 Homma et al. .............. 715/794
4,789,962 A * 12/1988 Berry et al. ................ 715/715
5,140,678 A * 8/1992 Torres ........................ 715/777
5,912,668 A * 6/1999 Sciammarella et al. ...... 715/788
6,181,338 B1 * 1/2001 Brodhun ..................... 715/798

OTHER PUBLICATIONS

Basta Computing, ZMover, Sep. 28, 2004, v.4.6, www.basta.com/ProdZMover.htm.*
CodePunk, "Advanced JavaScript Moving Windows," http://codepunk.hardwar.org.uk/ajs01.htm, Apr. 2002.*
Microsoft Press, "Microsoft Windows User Experience," 1999, pp. xvii and 126.*

* cited by examiner

*Primary Examiner*—William L Bashore
*Assistant Examiner*—Daniel Um
(74) *Attorney, Agent, or Firm*—Holand & Knight LLP; Brian J Colandreo, Esq.; V. Raman Bharatula

(57) ABSTRACT

Methods and apparatus, including computer program products, for a window positioner/sizer. A computer-implemented method of displaying information on a computer display device includes displaying a first popup window on a primary window, the first popup window comprising controls enabling selective positioning and sizing of the first popup window relative to the primary window.

18 Claims, 8 Drawing Sheets

10
Server
40
Processor
48
RAM
50
Network Interface
46
54
ROM
52
62
User Interface Program
60
App 2A
56
App 2B
58
Network
44
Processing Unit
12
Network Interface
42
Processor
20
RAM
22
ROM
24
38
User Interface Program
36
App 1A
32
App 1B
34
Input Device(s)
14
Input Device Controller(s)
28
Video Controller
30
Display
16
18
26

120

124

Quite small

Smallest

WINDOW POSITIONER/SIZER

BACKGROUND

The present invention relates to data processing by digital computer, and more particularly to a window positioner/sizer.

User interfaces (UIs) are an integral part of many business enterprise software applications. For example, Web Dynpro from SAP AG enables companies to model and design UIs cost-effectively and precisely. A Web Dynpro application includes a set of views, navigation between the views, concepts for managing the views and determining their sequence, a context for keeping session data, and the business logic of the application.

Within Web Dynpro application, popup (e.g., internal) windows are frequently used to help a user to make decisions about one or more operations that can be preformed on data in a main or primary window. The popup window, when open, can hide data of interest in the main window. The popup window is not resizable and not movable, so the user may have to close the popup window, memorize the data of interest from the primary window, and then reopen the popup window.

SUMMARY

The present invention provides methods and apparatus, including computer program products, for a window positioner/sizer.

In one aspect, the invention features a method including displaying a first popup window on a primary window, the first popup window including controls enabling selective positioning and sizing of the first popup window relative to the primary window.

In embodiments, the controls can include an up position control, a down position control, a left position control, a right position control, and a center position control.

The controls can include a popup window width control, and a popup window height control.

The controls can be absolute or relative.

The controls can be positioned in a second popup window. The second popup window can be displayed in response to a user selection of a popup manager.

The invention can be implemented to realize one or more of the following advantages.

The window positioner/sizer enables the movement and re-sizing of a popup window that is originally created to be non-resizable and non-moveable.

The window positioner/sizer enables a user to see all the data in the background (e.g., main window, primary window) without having to close and re-open the popup window.

Since the popup window can be resized it enables the user to better see the popup window data.

The window positioner/sizer enables sizing and positioning for a non-resizable non-movable internal window.

The window positioner/sizer is easy to implement (e.g., common DC or additional UI element) and improves user-friendliness of a popup window.

One implementation of the invention provides all of the above advantages.

Other features and advantages of the invention are apparent from the following description, and from the claims.

BRIEF DESCRIPTION OF THE DRAWINGS

Like reference numbers and designations in the various drawings indicate like

DETAILED DESCRIPTION

Figure 1:
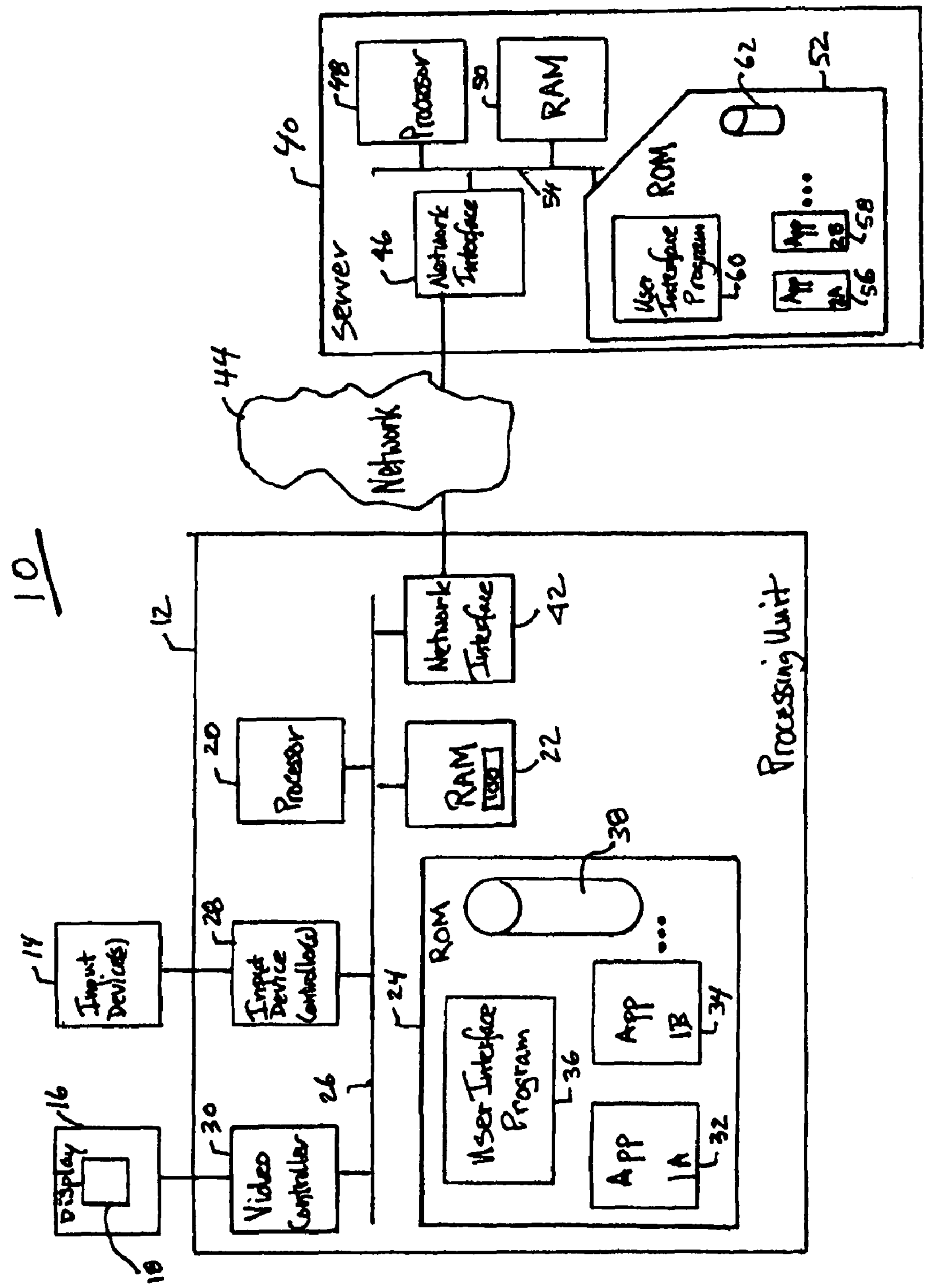
FIG. 1 is a block diagram of an exemplary system.

As shown in FIG. 1, an exemplary computer system 10 includes a processing unit 12, one or more input devices 14, and a display device 16, upon which a user is presented displays. The display device 16 has a video screen 18 upon which displays appear.

The processing unit 12 can include a processor 20, random access memory (RAM) 22, and read-only memory (ROM) 24, all interconnected by a data bus 26. Input device controllers 28, also connected to the data bus 26, receive command signals from input devices 14 and forward the command signals in the appropriate format for processing. A video controller 30, connected to the data bus 26, receives video command signals from the data bus 26 and generates the appropriate video signals that are forwarded to the display device 16 so that the desired display is provided on the screen 18. The system 10 is not limited to a personal computer (PC), but could include a personal digital assistant (PDA), a terminal, a workstation, or other such device.

ROM 24 provides non-volatile data storage for various application programs. In the example shown, a number of different application programs 32, 34, are stored in ROM 24. Also stored in ROM 24 is a user interface (UI) program 36 designed to work in concert with each of the application programs 32, 34. This is conceptually depicted by the UI program 36 shown as a layer on top of the application programs 32, 34. With such a design, UI program modules common to several application programs need not be duplicated in each of the application programs 32, 34. In addition, such a design may enable a common "look-and-feel" to the UI for the different program applications 32, 34. In other examples, the UI program, or module, is not a common program or module for more than one program application. In still other examples, the components described can be combined or separated in various manners, and can be stored in various manners, such as on various non-volatile storage medium.

Programs 32, 34, 36 have program instructions that can be loaded into RAM 22 during operation. Processor 20 then executes the program instructions, as required, to perform desired program functions.

Also stored in ROM 24 are various data in database 38. Database 38 includes data needed or generated during operation of the application programs 32, 34. Although only a single database 38 is shown that serves as a common database for all applications 32, 34, in other examples there can be separate databases for one, or more, of the applications 32, 34.

System 10 includes connection to a server 40 and a network interface 42, connected to its data bus 26. As such, system 10 can access server 40 over network 44 to run applications residing on the server 40. Network 44 can be, for example, a Local Area Network (LAN), Wide Area Network (WAN), or the Internet.

The server 40 includes a network interface 46, a processor 48, RAM 50, and ROM 52, all interconnected by a data bus 54. The server's network interface 46 provides the connection to network 44 so that client computer systems, such as system 10, can access the server 40. In similar fashion to computer system 10, the server ROM 52 includes various different application programs 56, 58, as well as a common user interface program 60 for the application programs 56, 58. ROM 52, in this example, includes data stored in database 62, although in other implementations separate databases or a separate database server may be required.

A Web Dynpro Application Programming Interface (API) enables the creation of windows using an IWDWindowManager interface. The IWDWindowManager interface includes createExternalWindow, a method that generates a window that contains/displays a Web Dynpro Components window with its view hierarchy. An external window, which is assigned an URL address, opens a new widow that is re-sizable and movable.

The IWDWindowManager interface includes createWindow, a method that generates a window that contains/displays a Web Dynpro Components window with its view hierarchy. Here the window type is "internal," meaning some clients can display it above the current view assembly and others will replace the view assembly. An internal window is an embedded window that is not re-sizable and not movable.

Figure 2:
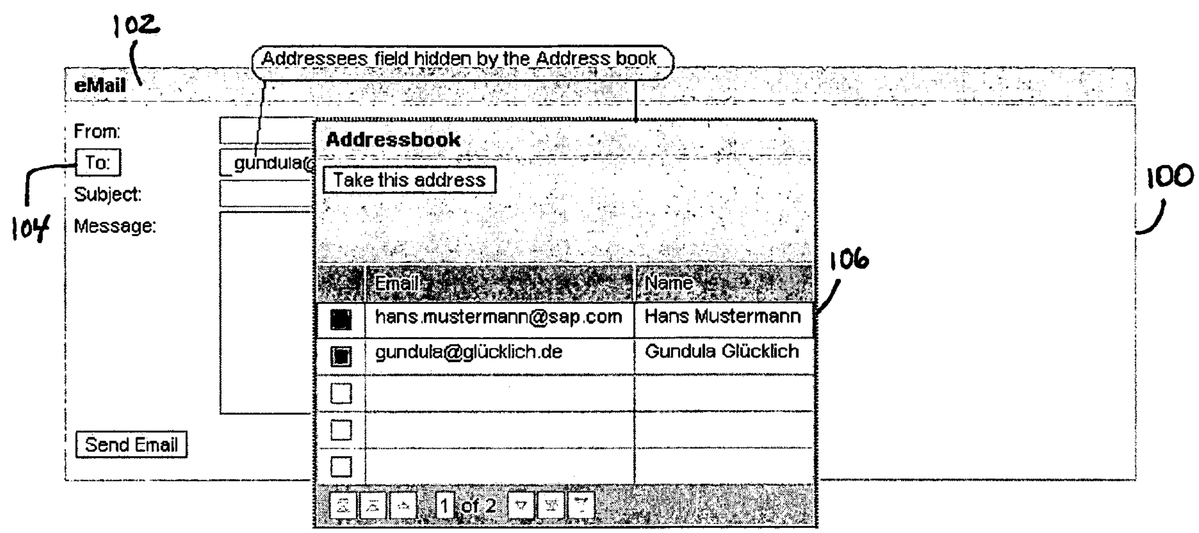
FIG. 2 is a block diagram of a graphical user interface (GUI).

As shown in FIG. 2, an exemplary primary window 100 includes an electronic mail (email) application 102. Pressing a "To:" button 104 causes generation of a popup window 106. In this particular example, the popup window 106 includes an address book used in conjunction with the To: button 104 (i.e., address field). It should be noted that the popup window 106 is not movable and not resizable, causing it to partially hide information contained in the primary window 100. More particularly, in this example, the address book in the popup window 106 is partially obstructing a previously entered address in the "To:" address field of the primary window 100 and the user cannot view that previously entered address. Accordingly, the user may have to close the popup window 106 in order to see what the entry in the address filed of primary window 100.

In other examples, if the primary window 100 is a large table, there is almost no room to enable a popup window to be positioned that does not obstruct at least part of the large table. If the user has to make an operation using a popup and on the data of the tables, the user may have to memorize table values or make a copy of them or close the popup window and reopen the popup window.

Memory 22 includes a window positioner/sizer process 100 that overcomes the disadvantages of popup windows obstructing primary windows. Process 100 enables a set of commands for positioning a popup window (e.g., up, down, left, right, and center). Process 100 enables a set of commands for resizing the popup window (e.g., width, height, or both).

The commands can be implemented, for example, as an additional feature of Web Dynpro's WDWindow class, a UI element for a popup window in the same way a table has a tool bar table that can contain a set of UI Elements, such as buttons, input fields, and so forth. The commands can also be implemented as a common DC.

Figure 3:
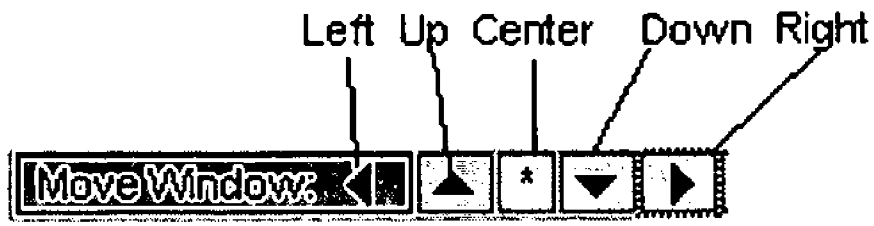
FIG. 3 is a block diagram of exemplary popup window controls.

As shown in FIG. 3, process 100 can display controls 120 that enable moving a popup window in an absolute or a relative manner. For example, commands enable the user to move the popup window in the following positions: top left, top center, top right or center left, center center, center right, bottom left, bottom center, and bottom right.

Figure 4:
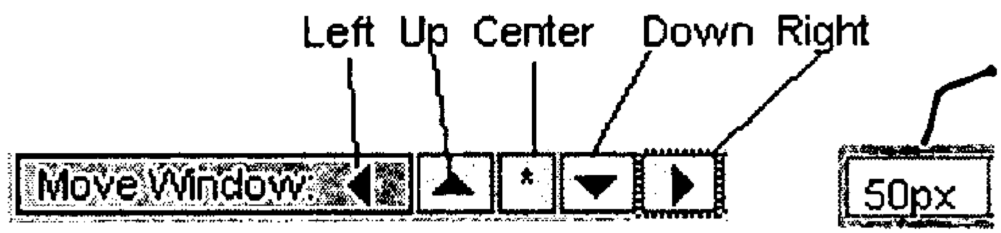
FIG. 4 is a block diagram of exemplary popup window controls.

As shown in FIG. 4, if moving if the popup window is relative, the user can enter the number of pixels 124 desired to move the popup window from previous coordinates.

Figure 5:
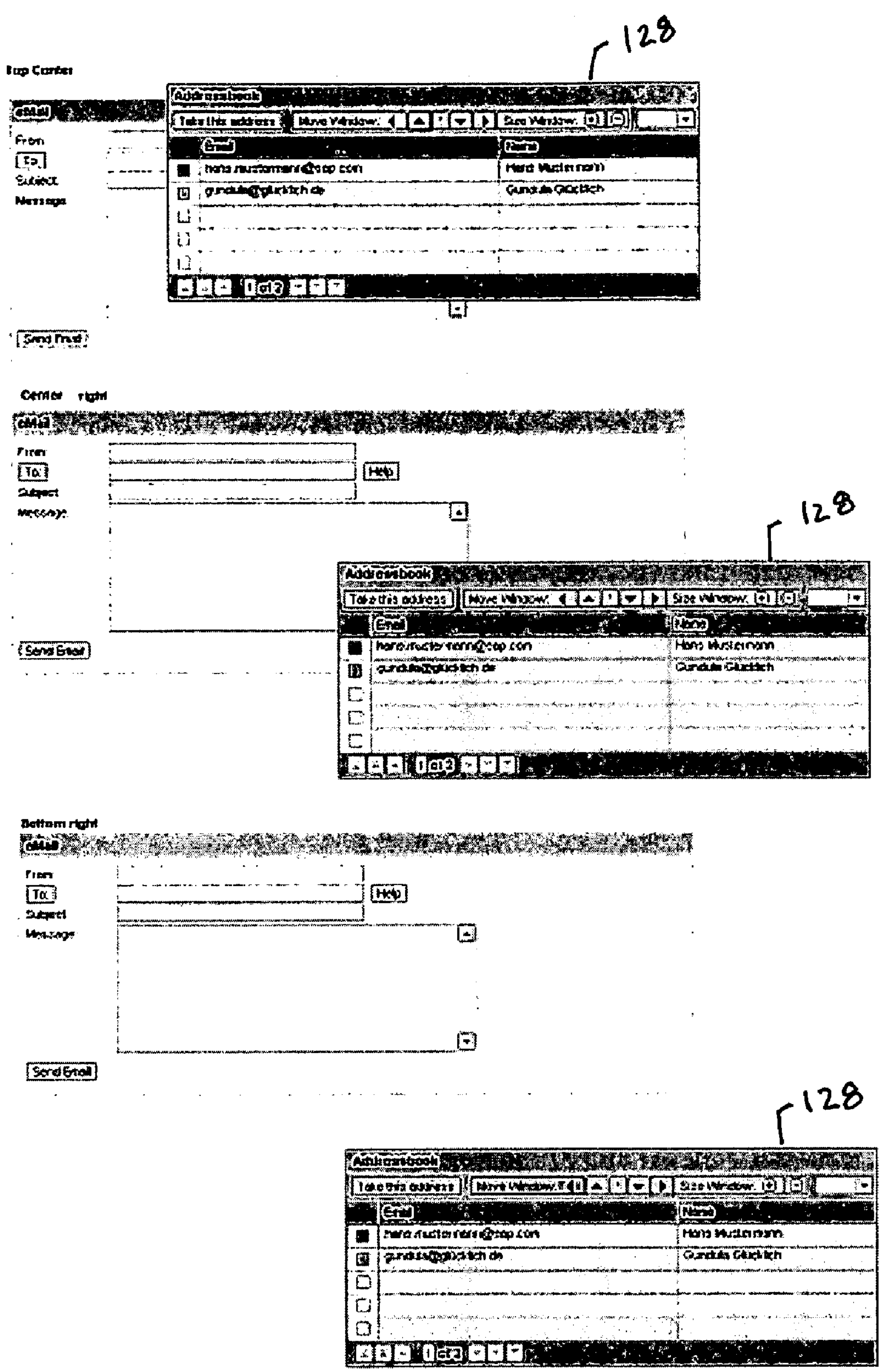
FIG. 5 is a block diagram of a GUI.

As shown in FIG. 5, a sample of the effect of positioning a popup window 128 top center, center right, and bottom right, is illustrated.

Figure 6:
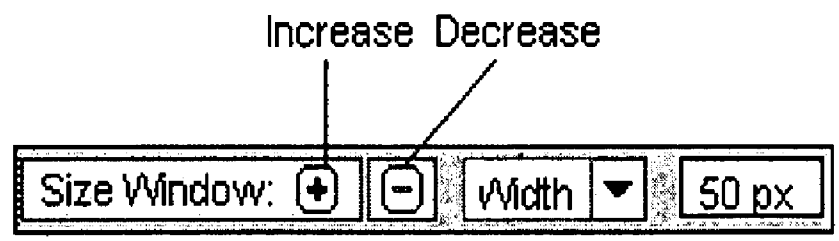
FIG. 6 is a block diagram of exemplary popup window controls.
Figure 6:
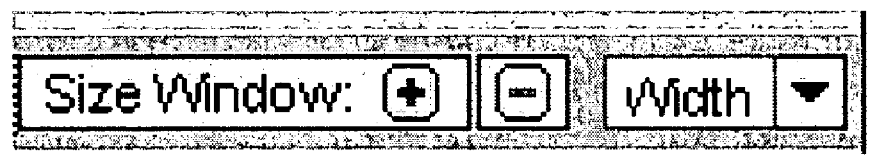
Figure 6:
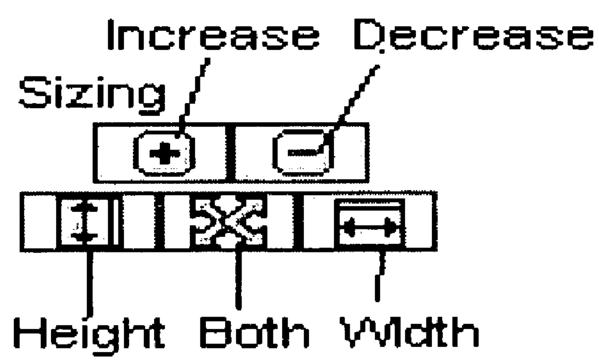

As shown in FIG. 6, sizing of the popup window can be done by increasing the width only, the height only, or both. The sizing can also be absolute, relative, or a predefined quantity. In one particular example, a predefined quantity is 50 or 100 pixels at a time.

Figure 7:
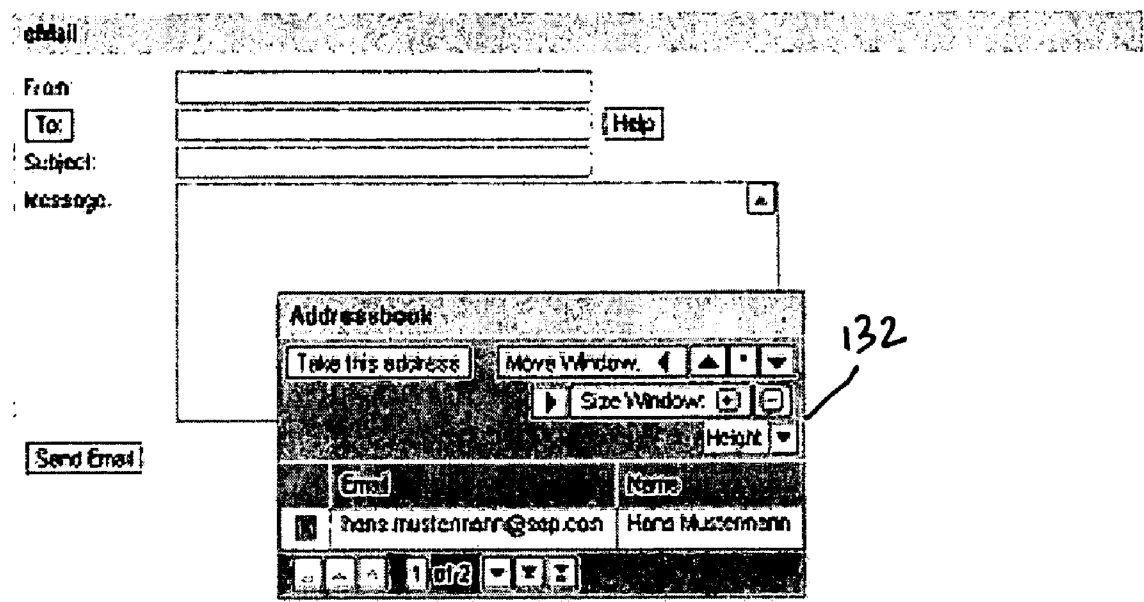
FIG. 7 is a block diagram of a GUI.
Figure 7:
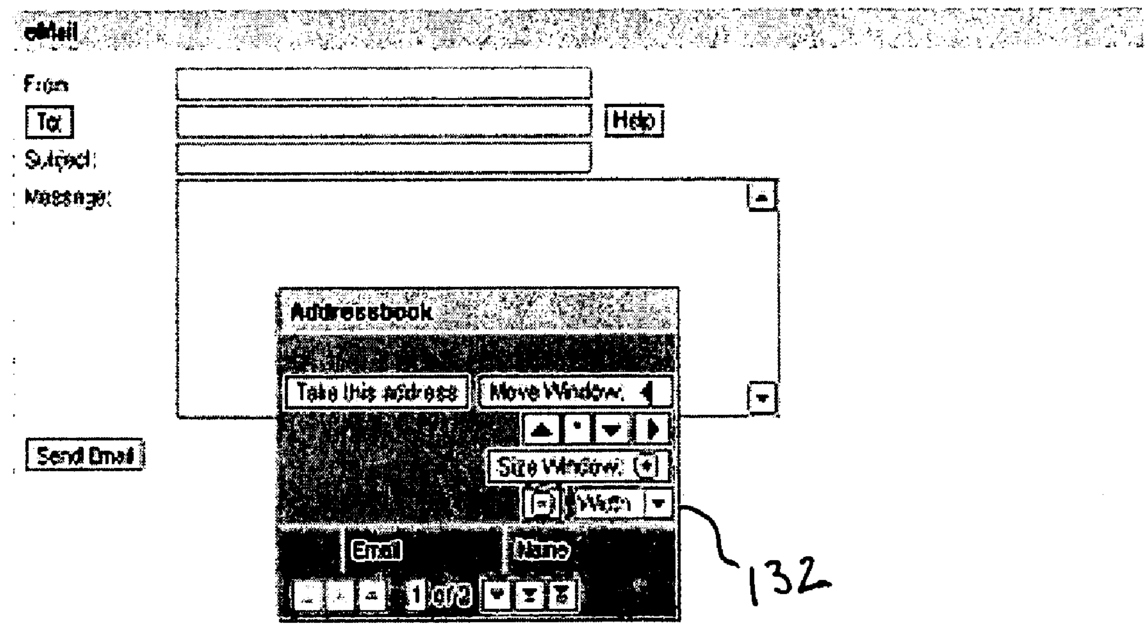

As shown in FIG. 7, process 100 enables a popup window 132 size to be reduced to allow more visible data for the primary background window.

Figure 8:
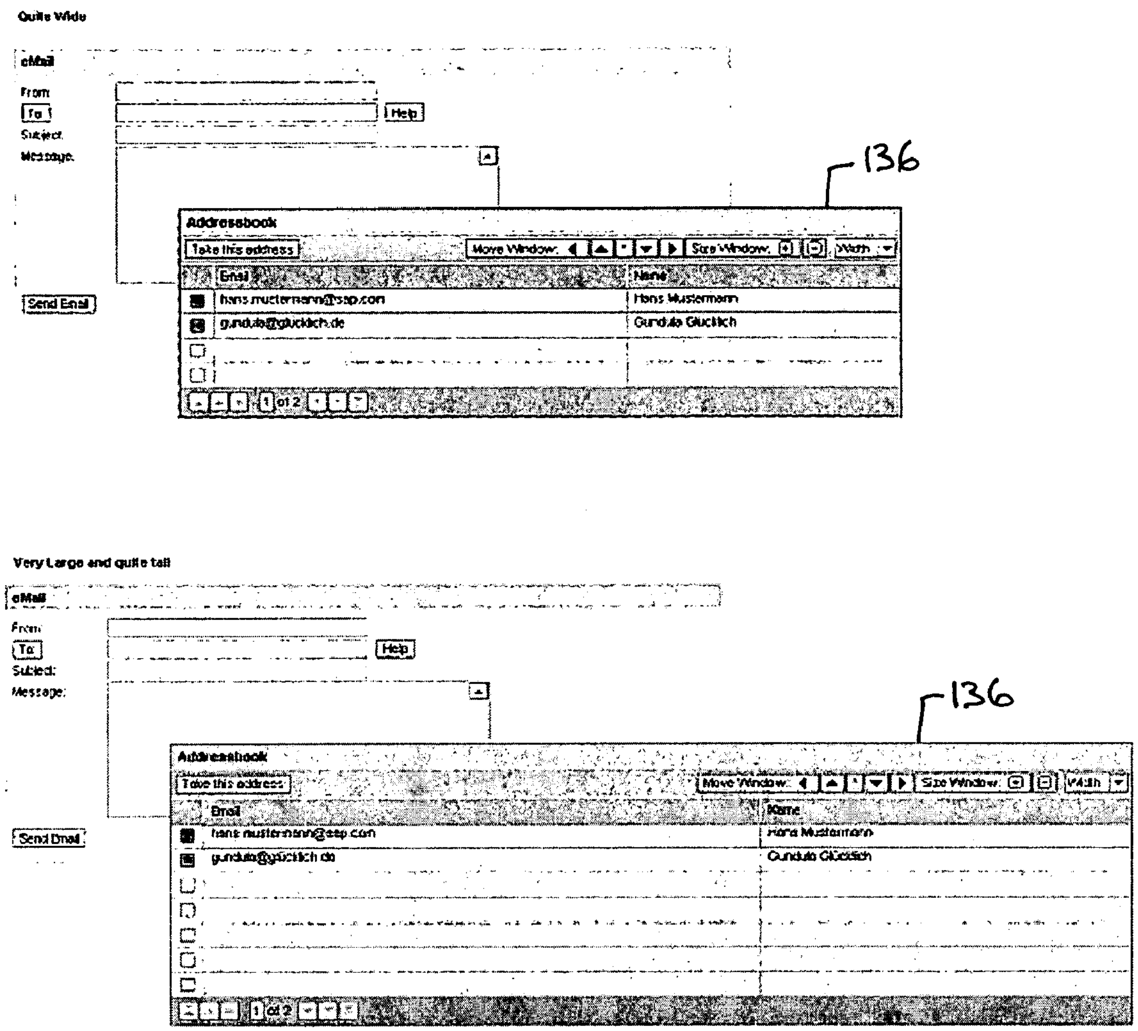
FIG. 8 is a block diagram of a GUI.

As shown in FIG. 8, process 100 enables a popup window 136 to be enlarged to better see the data within the popup window.

Figure 9:
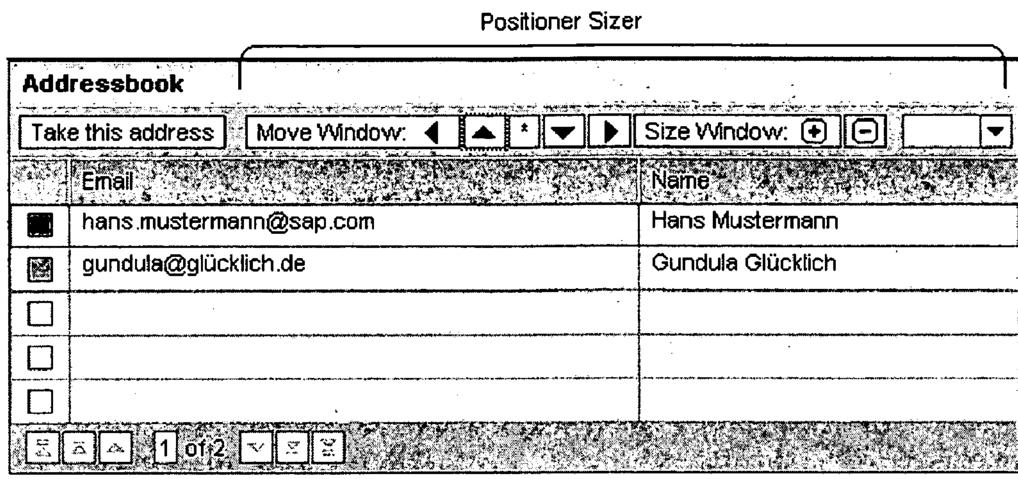
FIG. 9 is a block diagram of a GUI.
Figure 10:
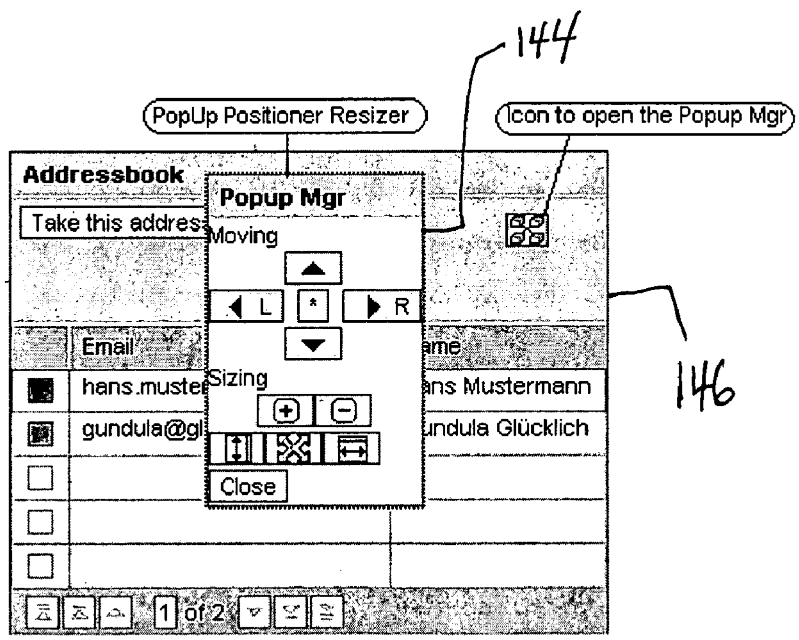
FIG. 10 is a block diagram of a GUI.

Window positioning/sizing controls can be directly incorporated in the popup window 140, as shown in FIG. 9, or incorporated within a popup window 144 of the popup window 146, as shown in FIG. 10.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method of displaying information on a display device comprising:

selecting a popup manager icon on a popup window, the popup manager icon configured to, at least in part, open a popup window manager;

displaying, in response to the selection of the popup manager icon, the popup window manager including a plurality of controls distinct from the popup manager icon, on top of the popup window;

selecting, via the popup window manager, at least one of the controls, each control configured to change a position of the popup window, the controls on the popup window manager including:

an up position control button which, when selected, moves the popup window to a top position, a down position control button which, when selected, moves the popup window to a bottom position, a left position control button which, when selected, moves the popup window to a left position, a right position control button which, when selected, moves the popup window to a right position, and a center position control button which, when selected, moves the popup window to a center position; and moving the popup window based upon, at least in part, the selection of at least one of the controls.

2. The computer-implemented method of claim 1 wherein the controls further include a popup window width control and a popup window height control.

3. The computer-implemented method of claim 2 wherein the controls are positioned in the popup window.

4. A computer system comprising:

a display device;

a central processing unit; and a memory wherein the display device is configured to:

display a popup window including a selectable popup manager icon configured to, at least in part, open a popup window manager;

display the popup window manager on top of the popup window in response to the selection of the selectable popup manager icon, the popup window manager including selectable controls distinct from the popup manager icon and configured to change a position of the popup window based upon, at least in part, a selection of one or more of the controls, the controls on the popup window manager including:

an up position control button which, when selected, moves the popup window to a top position, a down position control button which, when selected, moves the popup window to a bottom position, a left position control button which, when selected, moves the popup window to a left position, a right position control button which, when selected, moves the popup window to a right position, and a center position control button which, when selected, moves the popup window to a center position.

5. The system of claim 4 wherein the controls further include a popup window width control and a popup window height control.

6. The system of claim 5 wherein the controls are positioned in the popup window.

7. A computer program product, residing on a computer readable medium having a plurality of instructions stored thereon, which, when executed by a processor, cause the processor to perform operations comprising:

selecting a popup manager icon on a popup window, the popup manager icon configured to, at least in part, open a popup window manager;

displaying the popup window manager including a plurality of controls distinct from the popup manager icon on top of the popup window in response to the selection of the selectable popup manager icon;

selecting, via the popup window manager, at least one of the controls, each control configured to change a position of the popup window, the controls on the popup window manager including:

an up position control button which, when selected, moves the popup window to a top position, a down position control button which, when selected, moves the popup window to a bottom position, a left position control button which, when selected, moves the popup window to a left position, a right position control button which, when selected, moves the popup window to a right position, and a center position control button which, when selected, moves the popup window to a center position; and moving the popup window based upon, at least in part, the selection of at least one of the controls, the controls including dedicated buttons configured to allow movement in a particular direction corresponding to each of the controls.

8. The computer program product of claim 7 wherein the controls further include a popup window width control and a popup window height control.

9. The computer program product of claim 8 wherein the controls are positioned in the popup window.

10. The computer-implemented method of claim 1, wherein the controls further include an input control for entering a number of pixels, the number of pixels defining a distance from a primary window, the input control configured to move the popup window the distance from the primary window.

11. The computer system of claim 4, wherein the controls further include an input control for entering a number of pixels, the number of pixels defining a distance from a primary window, the input control configured to move the popup window the distance from the primary window.

12. The system computer program product of claim 7, wherein the controls further include an input control for entering a number of pixels, the number of pixels defining a distance from a primary window, the input control configured to move the popup window the distance from the primary window.

13. The computer-implemented method of claim 1, wherein the popup window including the popup manager icon is an address book window in an electronic mail application.

14. The computer system of claim 4, wherein the popup window including the popup manager icon is an address book window in an electronic mail application.

15. The computer program product of claim 7, wherein the popup window including the popup manager icon is an address book window in an electronic mail application.

16. The computer-implemented method of claim 1, wherein the popup window including the popup manager icon is part of a Web Dynpro application.

17. The computer system of claim 4, wherein the popup window including the popup manager icon is part of a Web Dynpro application.

18. The computer program product of claim 7, wherein the popup window including the popup manager icon is part of a Web Dynpro application.

* * * * *